United States Patent
Lee et al.

(10) Patent No.: US 9,823,443 B2
(45) Date of Patent: Nov. 21, 2017

(54) IMAGING LENS AND IMAGING APPARATUS INCLUDING THE SAME

(71) Applicant: Samsung Electronics Co., Ltd., Suwon-si, Gyeonggi-do (KR)

(72) Inventors: Hwan-seon Lee, Suwon-si (KR); Tae-youn Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/069,382

(22) Filed: Mar. 14, 2016

(65) Prior Publication Data

US 2016/0274334 A1 Sep. 22, 2016

(30) Foreign Application Priority Data

Mar. 18, 2015 (KR) .................. 10-2015-0037701

(51) Int. Cl.
| | |
|---|---|
| *G02B 3/02* | (2006.01) |
| *G02B 13/18* | (2006.01) |
| *G02B 13/00* | (2006.01) |
| *G02B 9/60* | (2006.01) |

(52) U.S. Cl.
CPC ........... *G02B 13/0045* (2013.01); *G02B 9/60* (2013.01)

(58) Field of Classification Search
CPC ............. G02B 13/18; G02B 9/60; G02B 3/04
USPC .................................... 359/708, 714
See application file for complete search history.

(56) References Cited

U.S. PATENT DOCUMENTS

| | | | |
|---|---|---|---|
| 7,864,454 B1 | 1/2011 | Tang et al. | |
| 8,035,723 B2 | 10/2011 | Sano et al. | |
| 8,179,615 B1 | 5/2012 | Tang et al. | |
| 8,451,545 B2 | 5/2013 | Hsieh et al. | |
| 8,508,860 B2 | 8/2013 | Tang et al. | |
| 8,599,498 B2 | 12/2013 | Huang | |
| 8,717,687 B2 | 5/2014 | Hsu et al. | |
| 2014/0340765 A1* | 11/2014 | Tsai et al. ..................... 359/714 |

FOREIGN PATENT DOCUMENTS

JP             5391806 B2        10/2013

* cited by examiner

*Primary Examiner* — James Greece
(74) *Attorney, Agent, or Firm* — Jefferson IP Law, LLP

(57) ABSTRACT

An imaging lens is provided. The imaging lens includes, in an order from an object side to an image plane side, a first lens having an object side surface that is convex and having a positive refractive power, a second lens having a positive or negative refractive power, a third lens having a positive or negative refractive power, a fourth lens having a negative refractive power, and a fifth lens having a positive or negative refractive power, wherein an image side surface of the fifth lens has a concave center portion and has at least one inflection point, and the imaging lens satisfies a condition that $-0.25 \leq (Y-y_p)/y_p \leq -0.05$, where Y denotes an image height of a real chief ray, and $y_p$ denotes an image height of a paraxial chief ray.

13 Claims, 13 Drawing Sheets

IMAGING LENS AND IMAGING APPARATUS INCLUDING THE SAME

CROSS-REFERENCE TO RELATED APPLICATION(S)

This application claims the benefit under 35 U.S.C. §119(a) of a Korean patent application filed on Mar. 18, 2015 in the Korean Intellectual Property Office and assigned Serial number 10-2015-0037701, the entire disclosure of which is hereby incorporated by reference.

TECHNICAL FIELD

The present disclosure relates to imaging lenses and imaging apparatuses including the imaging lenses.

BACKGROUND

Digital cameras or video cameras having a solid state imaging device such as a charge-coupled device (CCD), a complementary metal-oxide semiconductor (CMOS), or the like, have recently become widely distributed.

An imaging apparatus that uses a solid state imaging device is also suitable for devices having a compact size, and thus is currently used in mobile devices such as smartphones.

However, as body thickness of smartphones is gradually reducing, importance on miniaturization of an imaging lens module used in the smartphone is increasing. Also, as user expertise with respect to cameras continuously increases, there is demand for a design plan to realize an optical performance that is appropriate for a particular purpose along with miniaturization.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide ultra-compact imaging lenses that are applicable to a thin mobile device and imaging apparatuses including the ultra-compact imaging lenses.

In accordance with an aspect of the present disclosure, an imaging lens is provided. The imaging lens includes, in an order from an object side to an image plane side, a first lens having an object side surface that is convex and having a positive refractive power, a second lens having a positive or negative refractive power, a third lens having a positive or negative refractive power, a fourth lens having a negative refractive power, and a fifth lens having a positive or negative refractive power. An image side surface of the fifth lens has a concave center portion and has at least one inflection point, and the imaging lens satisfies a condition that $-0.25 \leq (Y-yp)/yp \leq -0.05$, where Y denotes an image height of a real chief ray, and yp denotes an image height of a paraxial chief ray.

In accordance with another aspect of the present disclosure, an imaging lens is provided. The imaging lens includes, in an order from an object side to an image plane side, a first lens having an object side surface having an aspherical shape that is convex in a center portion and an image side surface having a planar or convex aspherical shape, the first lens having a positive refractive power, a second lens having at least one surface that has an aspherical shape that is planar in a center portion, a third lens having a convex image side surface and a positive refractive power, a fourth lens having a negative refractive power, and a fifth lens having a positive or negative refractive power. The imaging lens satisfies a condition that $-0.25 \leq (Y-yp)/yp \leq -0.05$, where Y denotes an image height of a real chief ray, and yp denotes an image height of a paraxial chief ray.

In accordance with another aspect of the present disclosure, an imaging apparatus is provided. The imaging apparatus includes the imaging lens described above and an image sensor configured to convert an optical image formed using the imaging lens into an electrical signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

As will be described hereinafter, an "an object side surface" of each lens is a lens surface facing an object (hereinafter OBJ) based on an optical axis and is referred to as a left surface on drawings, and a "an image side surface" is a lens surface facing an imaging plane (hereinafter IMG) based on the optical axis and is referred to as a right surface on the drawings.

Expressions such as "at least one of," when preceding a list of elements, modify the entire list of elements and do not modify the individual elements of the list.

Figure 1:
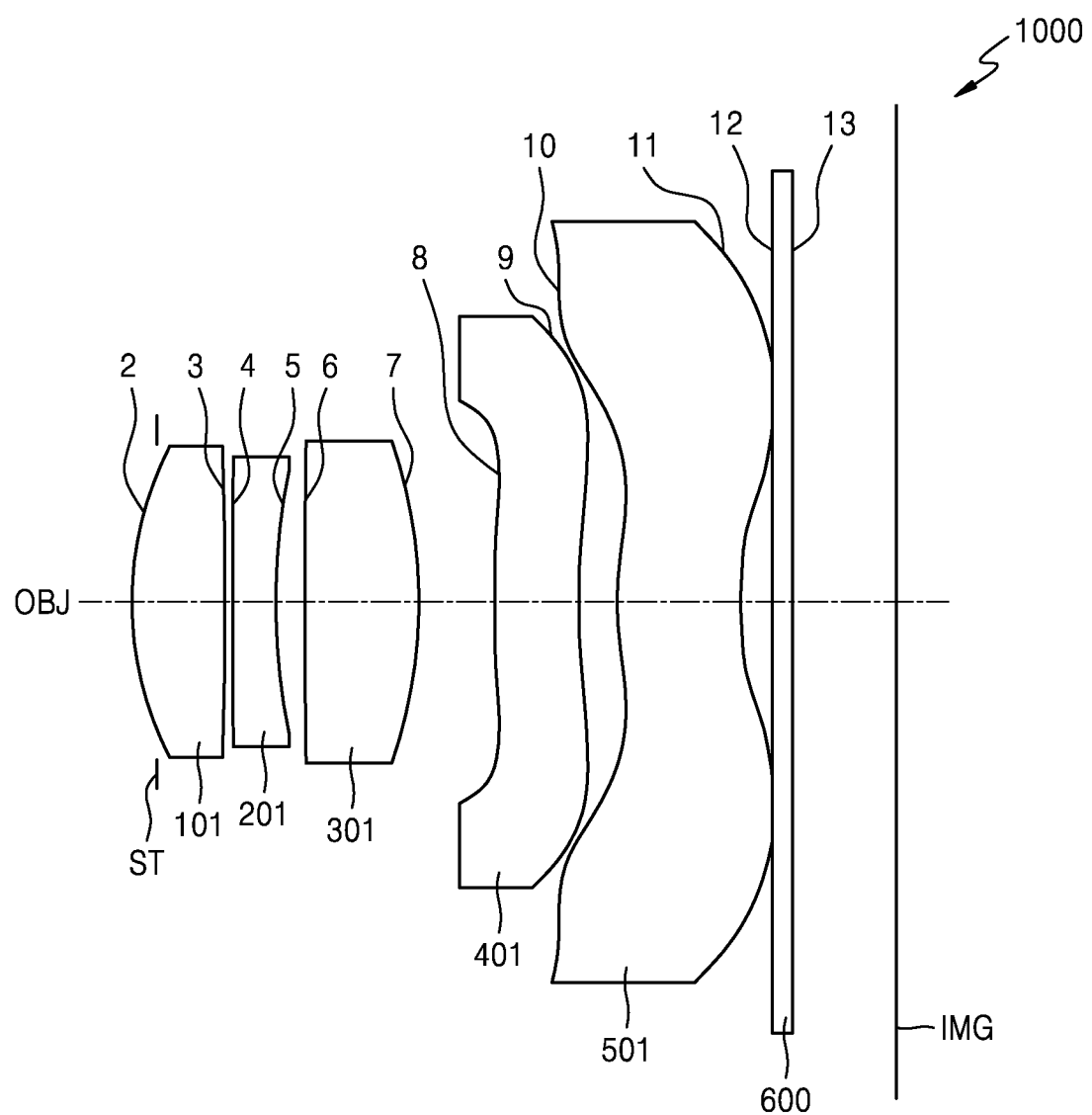
FIG. 1 illustrates an optical arrangement of an imaging lens according to an embodiment of the present disclosure.

FIG. 1 illustrates an optical arrangement of an imaging lens according to an embodiment of the present disclosure.

Referring to FIG. 1, an imaging lens 1000 includes a first lens 101, a second lens 201, a third lens 301, a fourth lens 401, and a fifth lens 501 that are sequentially arranged from an object side OBJ toward an image plane IMG. The first lens 101 has a positive refractive power, the second lens 201 has a negative refractive power, the third lens 301 has a positive refractive power, the fourth lens 401 has a negative refractive power, and the fifth lens 501 has a negative refractive power. However, arrangement of refractive power of the first through fifth lenses 101 through 501 is not limited thereto. For example, the second lens 201 may have a positive refractive power, the third lens 301 may have a negative refractive power, and the fifth lens 501 may have a positive refractive power. The first lens 101 includes an object side surface 2 and an image side surface 3, the second lens 201 includes an object side surface 4 and an image side surface 5, the third lens 301 includes an object side surface 6 and an image side surface 7, the fourth lens 401 includes an object side surface 8 and an image side surface 9, and the fifth lens 501 includes an object side surface 10 and an image side surface 11.

A filter 600 may be disposed between the fifth lens 501 and the image plane IMG. The filter 600 may be, for example, an infrared cut-off filter or an optical low pass filter. The filter 600 may be omitted. Alternatively, one or both of the filter 600 and a cover glass may be disposed between the fifth lens 501 and the image plane IMG. The filter 600 includes an object side surface 12 and an image side 13.

An image sensor (not shown) such as a charge-coupled device (CCD), a complementary metal-oxide semiconductor (CMOS), or the like is disposed on the image plane IMG.

An aperture stop ST may be disposed at an object side of the first lens 101. Although the aperture stop ST is illustrated as being adjacent to an object side surface of the first lens 101, the various embodiments are not limited thereto, and the aperture stop ST may also be disposed at an image side of the first lens 101.

The imaging lens 1000 sets details of the first through fifth lenses 101 through 501 so as to reduce a total length and embody a high optical performance. The first through fifth lenses 101 through 501 may have an appropriate number of aspherical surfaces to correct aberration. At least one surface of each of the first through fifth lenses 101 through 501 may be aspherical. For example, the object side surface of the first lens 101 may have a convex aspherical shape. An object side surface of the fifth lens 501 may have a convex aspherical shape. An image side surface of the fifth lens 501 may have an aspherical shape having a concave center portion, that is, being concave around an optical axis, and may have at least one inflection point.

The imaging lens 1000 satisfies a condition of Equation 1 below:

$$-0.25 \leq (Y-y_p)/y_p \leq -0.05 \qquad \text{Equation 1}$$

Here, Y denotes an image height of a real chief ray, that is, a real image height, and yp denotes an image height of a paraxial chief ray.

The above condition is provided in order that the imaging lens 1000 has negative optical distortion to realize a compact size of devices.

Figure 2:
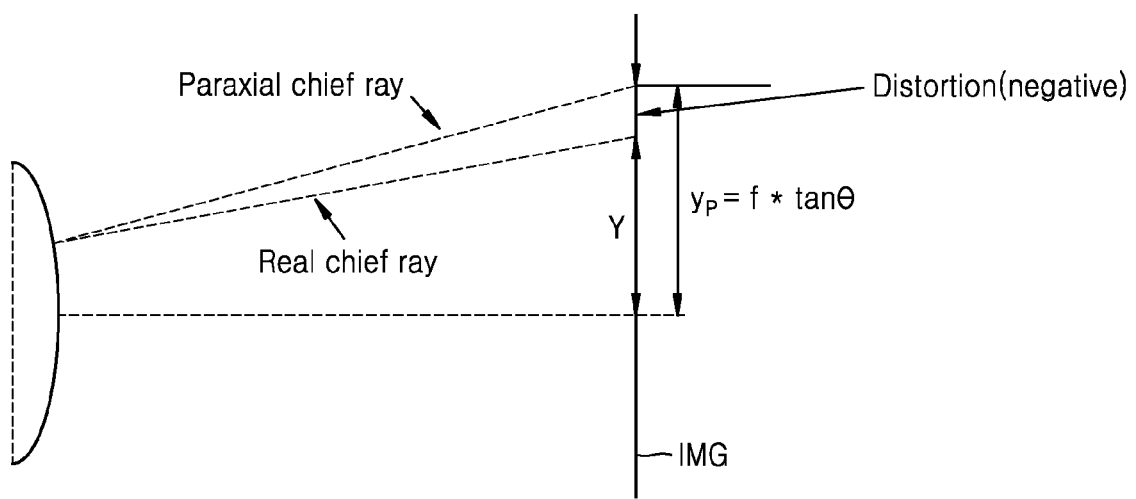
FIG. 2 is a conceptual diagram illustrating negative distortion according to an embodiment of the present disclosure.

FIG. 2 is a conceptual diagram illustrating negative distortion according to an embodiment of the present disclosure.

Referring to FIG. 2, negative distortion denotes that an actual image height Y is lower than an image height yp of a paraxial chief ray. When Equation 1 is satisfied, an actual image height may be lower than a height of an image sensor placed on the image plane IMG, and thus a total length of the imaging lens 1000 may be reduced. In addition, the above optical distortion may be handled by correction. Typical imaging lenses usually have optical distortion set to be within ±2%, whereas according to the present embodiment, optical distortion of up to −25% is allowed, and thus imaging lenses according to the present embodiment may be used to facilitate a compact size of devices. Also, image processing whereby distortion is corrected may produce distortion-less images.

If an upper limit of Equation 1 is exceeded, an optical total length according to a distortion ratio may not be reduced enough, and if a lower limit of Equation 1 is not reached, a resolution of a periphery of a screen may be degraded after image processing as a distortion correction ratio is increased.

Equation 1 may be modified to produce Equation 2 as shown below, based on yp=f*tan θ.

$$-25 \leq (((1/f)*(Y/\tan \theta))-1)*100 \leq -5 \qquad \text{Equation 2}$$

Here, f denotes a focal length of the imaging lens 1000, Y denotes an image height of a real chief ray, and θ denotes a half view angle.

The imaging lens 1000 may satisfy a condition of Equation 3 as shown below.

$$0.5 < TL/(2*y_p) < 0.75 \qquad \text{Equation 3}$$

Here, TL denotes a distance from a vertex of the object side surface of the first lens 101 to the image plane IMG along an optical axis, and $y_p$ denotes an image height of a paraxial chief ray, that is, corresponds to a half of a diagonal length of the image sensor.

When a filter-type element such as an infrared cut-off filter or a cover glass is included along the optical axis, an air conversion value is applied to TL. That is, $(1-(1/n))*d$ is applied to calculate TL, where n denotes a refractive index of the filter 600 and d denotes a thickness of the filter 600.

If an upper limit of Equation 2 is exceeded, an optical total length is increased so that a camera module becomes thick. If a lower limit of Equation 2 is not reached, it is difficult to correct aberration such as astigmatism or astigmatic field curvatures and thus, performance corresponding to high-resolution pixels may be difficult to provide.

Referring to FIG. 1, the object side surface 2 of the first lens 101 may have a convex aspherical shape. The image side surface 3 of the first lens 101 may have a planar center portion or a convex aspherical shape.

At least one of the two surfaces 4 and 5 of the second lens 201 may have an aspherical shape having a planar center portion, that is, a center portion having an infinite radius of curvature.

The imaging lens 1000 may satisfy a condition of Equation 4 as shown below.

$$(R3+R4)/(R3-R4)|=1 \qquad \text{Equation 4}$$

Here, R3 and R4 respectively denote a radius of curvature of a vertex of the object side surface 4 of the second lens 201 and a radius of curvature of a vertex of the image side surface 5 of the second lens 201.

Equation 4 is related to a surface shape of the second lens 201. When Equation 4 is satisfied, coma aberration due to surface decenter may be reduced.

The imaging lens 1000 may satisfy a condition of Equation 5 as shown below.

$$0.1 < f/f3 < 0.8 \qquad \text{Equation 5}$$

Here, f denotes a focal length of the imaging lens 1000, and f3 denotes a focal length of the third lens 301.

Equation 5 defines a range of a ratio between the focal length of the imaging lens 1000 and the focal length of the third lens 301.

When a range of Equation 5 is satisfied, spherical aberration is easily corrected so that it is easy to reduce manufacture sensitivity due to shape error in the manufacture. If an upper limit of Equation 5 is exceeded, refractive power of the third lens 301 may be excessively large so that it is difficult to control coma and astigmatism. If a lower limit of Equation 5 is not reached, refractive power of the third lens 301 may be too small such that it is difficult to control various aberrations, and accordingly, sensitivity regarding manufacture error regarding shapes of the fourth lens 401 and the fifth lens 501 is likely to increase.

The imaging lens 1000 may satisfy a condition of Equation 6 as shown below.

$$|V2-V3| > 30 \qquad \text{Equation 6}$$

Here, V2 and V3 are respectively Abbe numbers of the second lens 201 and the third lens 301.

The Abbe numbers of the second lens 201 and the third lens 301 are defined by Abbe numbers of a wavelength d-line. Equation 6 is used to correct longitudinal chromatic aberration, and within a range satisfying Equation 6, longitudinal chromatic aberration may be easily corrected.

The image side surface 9 of the fourth lens 401 may be a concave aspherical shape.

The imaging lens 1000 may satisfy a condition of Equation 7 as shown below.

$$-0.7 < f/f4 < -0.1 \qquad \text{Equation 7}$$

Here, f denotes the focal length of the imaging lens 1000, and f4 denotes a focal length of the fourth lens 401.

Equation 7 defines a ratio between the focal length of the imaging lens 1000 and the focal length of the fourth lens 401.

If an upper limit of Equation 7 is exceeded, refractive power of the fourth lens 401 is reduced, and dependence on higher degree terms of aspherical coefficients for controlling chromatic aberration of magnification of a periphery portion increases, and accordingly, it is difficult to control coma, magnification chromatic aberration, and astigmatism of the periphery portion.

If a lower limit if Equation 7 is not reached, a radius of curvature of a concave shape of the fourth lens 41 at the image plane is reduced, that is, negative refractive power of the fourth lens 401 is increased so that sensitivity of the aspherical shape according to asphericity of the fourth lens 401 at the object side is increased. Consequently, it is difficult to control distortion aberration and astigmatism.

The image side surface 11 of the fifth lens 501 may have an aspherical shape having a concave center portion, that is, being concave around the optical axis, and having at least one inflection point. The object side surface 10 of the fifth lens 501 may have an aspherical shape having a convex center portion.

The imaging lens 1000 may satisfy a condition of Equation 8 as shown below.

$$f/f5| < 0.2 \qquad \text{Equation 8}$$

Here, f5 denotes the focal length of the imaging lens 1000, and f denotes a focal length of the fifth lens 501.

Equation 8 defines a ratio between the focal length of the imaging lens 1000 and the focal length of the fifth lens 501. The fifth lens 501 may have a positive or negative refractive power according to Equation 8.

If an upper limit of Equation 8 is exceeded, the focal length of the fifth lens 501 is reduced so that refractive power of the fifth lens 501 is increased, and accordingly, positive distortion aberration is likely to occur, and negative distortion aberration is reduced on the whole.

The first through fifth lenses 101 through 501 may be formed of plastic materials but embodiments are not limited thereto. When using plastic materials, aspherical lenses may be easily formed, and the resulting imaging lens 1000 are lightweight and may be manufactured at reduced costs.

Hereinafter, detailed elements of several embodiments will be described along with lens data. In the lens data, ST refers to an aperture stop, and "*" after a number of a surface indicates the surface is aspherical. FNO refers to F-number, f refers to a focal length, and θ refers to a half view angle. A unit of the focal length, a curvature radius, a thickness, or a space is mm.

An aspherical surface is defined by Equation 9 as follows:

$$Z = \frac{cX^2}{1 + \sqrt{1 - (1+K)c^2 X^2}} + AX^4 + BX^6 + CX^8 + DX^{10} + EX^{12} + FX^{14} + \ldots$$

Equation 9

Here, Z denotes a distance from a vertex of a lens along an optical axis, X denotes a distance from the vertex of the lens along a vertical direction with respect to an optical axis, K denotes a conic constant, A, B, C, D, E, and F denote aspherical coefficients, and c denotes an inverse number 1/R of a radius of curvature at the vertex of the lens.

First Embodiment

Referring again to FIG. 1, an optical arrangement of the imaging lens 1000 according to an embodiment of the present disclosure is illustrated.

The imaging lens 1000 includes, in an order from the object side OBJ to the image plane IMG, the first lens 101 having a positive refractive power, the second lens 201 having a negative refractive power, the third lens 301 having a positive refractive power, the fourth lens 401 having a negative refractive power, and the fifth lens 501 having a negative refractive power.

Lens data of the first embodiment is described by way of example in the following Table 1 and Table 2.

Referring to Tables 1 and 2, the following variables are denoted by f=3.94 mm, FNO=1.99, and θ=40.97°. An "*" after a number of a surface indicates the surface is aspherical.

TABLE 1

| Surface | Curvature Radius | Thickness or Space | Refractive Index | Abbe Number |
|---|---|---|---|---|
| ST | infinity | −0.153 | | |
| 2* | 1.91 | 0.596 | 1.544 | 56.09 |
| 3* | −2000 | 0.04 | | |

TABLE 1-continued

| Surface | Curvature Radius | Thickness or Space | Refractive Index | Abbe Number |
|---|---|---|---|---|
| 4* | infinity | 0.28 | 1.643 | 22.4 |
| 5* | 3.934 | 0.191 | | |
| 6* | 9.986 | 0.724 | 1.544 | 56.09 |
| 7* | −5.62 | 0.494 | | |
| 8* | 6.994 | 0.533 | 1.643 | 22.4 |
| 9* | 3.489 | 0.249 | | |
| 10* | 1.907 | 0.784 | 1.535 | 55.71 |
| 11* | 1.438 | 0.216 | | |
| 12 | infinity | 0.11 | 1.517 | 64.2 |
| 13 | infinity | 0.679 | | |
| IMG | infinity | 0 | | |

TABLE 2

| Surface | 2 | 3 | 4 | 5 | 6 |
|---|---|---|---|---|---|
| K | −0.2809 | 99 | 99 | 15.44476 | 97.52086 |
| A | −1.92E−02 | −7.00E−02 | −5.37E−02 | −6.82E−02 | −7.07E−02 |
| B | 3.04E−02 | 1.71E−01 | 2.43E−01 | 1.37E−01 | −3.04E−02 |
| C | −1.38E−01 | −3.02E−01 | −4.86E−01 | −4.38E−01 | 8.75E−02 |
| D | 2.15E−01 | 9.25E−02 | 5.09E−01 | 6.69E−01 | −2.84E−01 |
| E | −1.97E−01 | 3.09E−01 | −2.38E−01 | −6.53E−01 | 3.60E−01 |
| F | 7.86E−02 | −3.88E−01 | 8.31E−03 | 3.00E−01 | −2.60E−01 |
| G | −8.82E−03 | 1.49E−01 | 3.86E−02 | 0.00E+00 | 1.47E−01 |
| H | 0.00E+00 | 0.00E+00 | 0.00E+00 | 0.00E+00 | 0.00E+00 |

| Surface | 7 | 8 | 9 | 10 | 11 |
|---|---|---|---|---|---|
| K | 7.56875 | −92.90331 | −57.394 | −16.91242 | −4.76624 |
| A | −4.23E−02 | −3.73E−04 | −6.46E−02 | −1.83E−01 | −1.11E−01 |
| B | −9.01E−02 | −9.89E−02 | 8.79E−02 | −6.23E−03 | 4.80E−02 |
| C | 2.68E−01 | 2.30E−01 | −9.38E−02 | 7.93E−02 | −1.70E−02 |
| D | −5.45E−01 | −4.85E−01 | 5.37E−02 | −6.13E−02 | 4.20E−03 |
| E | 6.49E−01 | 5.87E−01 | −1.95E−02 | 2.56E−02 | −7.59E−04 |
| F | −4.14E−01 | −4.20E−01 | 4.46E−03 | −6.07E−03 | 1.01E−04 |
| G | 1.13E−01 | 1.63E−01 | −5.92E−04 | 7.60E−04 | −8.58E−06 |
| H | 0.00E+00 | −2.71E−02 | 3.56E−05 | −3.90E−05 | 3.40E−07 |

Figure 3A:
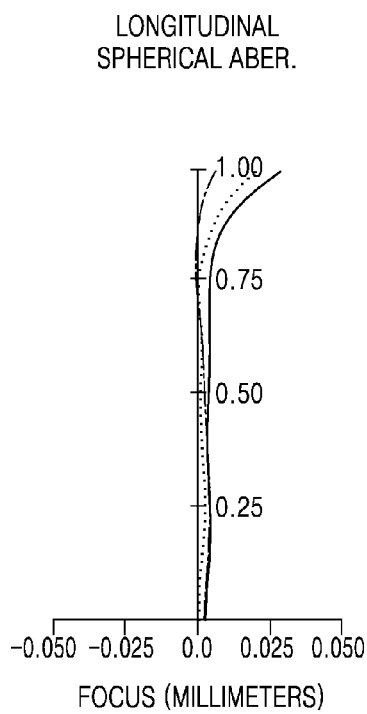
FIGS. 3A to 3C are aberration views illustrating a longitudinal spherical aberration, astigmatic field curves, and a distortion of an imaging lens of FIG. 1 according to an embodiment of the present disclosure.
Figure 3B:
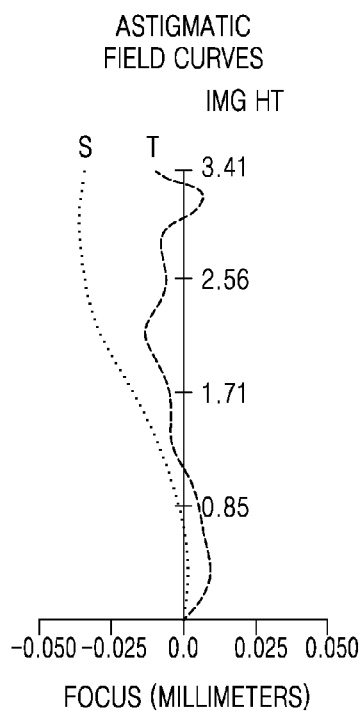
Figure 3C:
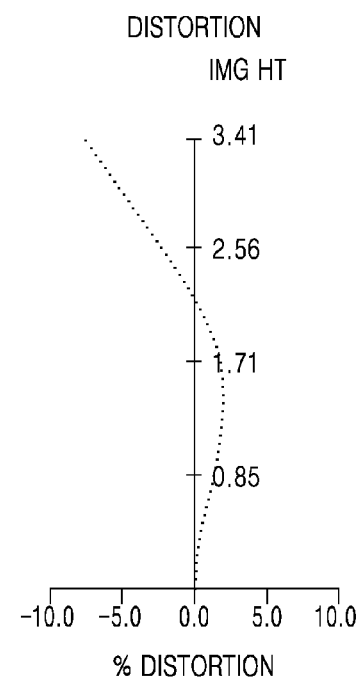

FIGS. 3A to 3C are aberration views illustrating a longitudinal spherical aberration, astigmatic field curves, and a distortion of an imaging lens according to a first embodiment of the present disclosure.

Referring to FIG. 3A, longitudinal spherical aberrations are shown for lights having wavelengths of 656.27 nm, 587.56 nm, and 486.1300 nm.

Referring to FIG. 3B, astigmatic field curves are shown for light having a wavelength of 587.56 nm. In the graph of the astigmatic field curves, a sagittal field curvature and a tangential field curvature are respectively denoted by S and T.

Referring to FIG. 3C, distortion is shown for light having a wavelength of 587.56 nm.

Second Embodiment

Figure 4:
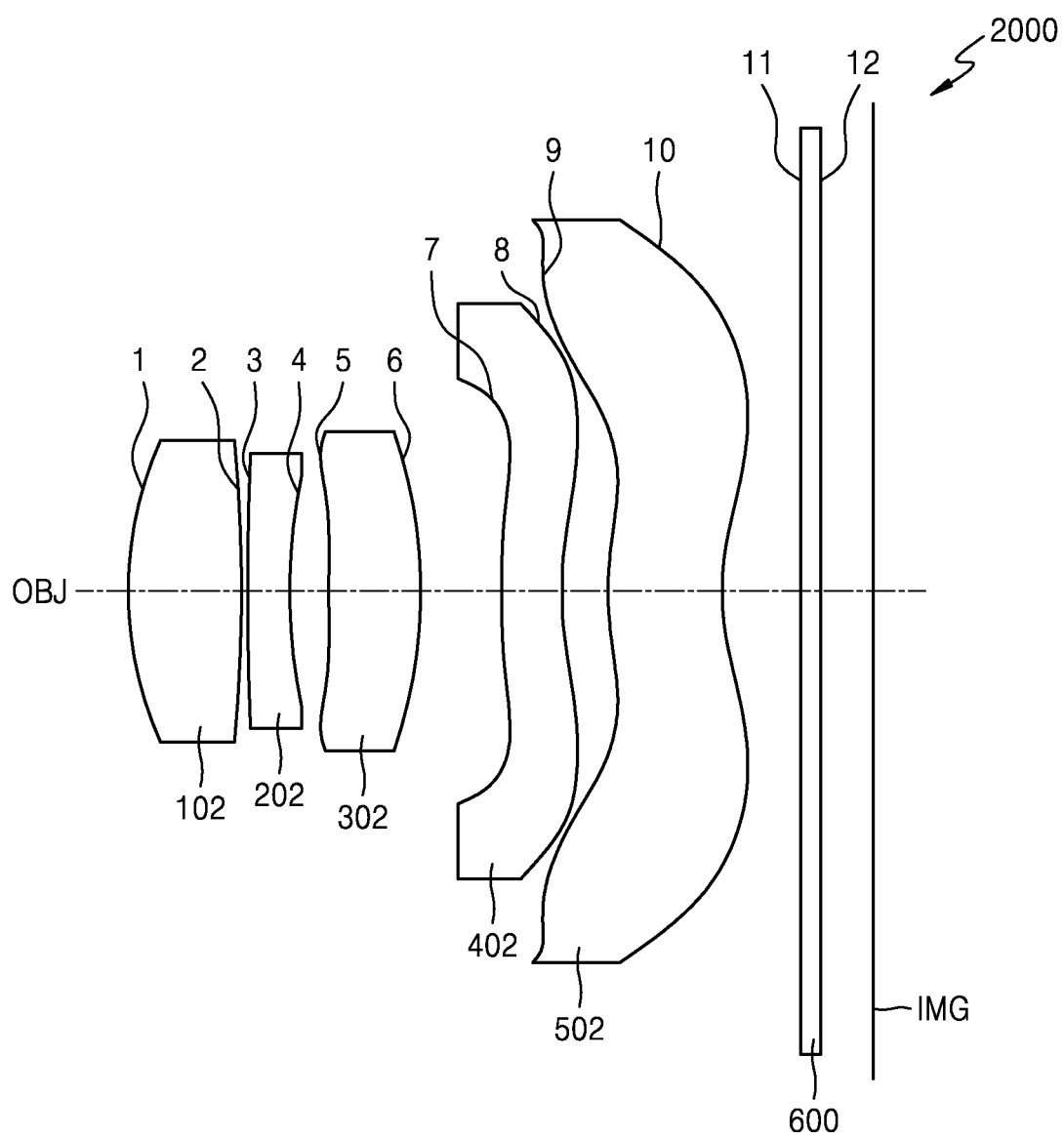
FIG. 4 illustrates an optical arrangement of an imaging lens according to an embodiment of the present disclosure.

FIG. 4 illustrates an optical arrangement of an imaging lens according to a second embodiment of the present disclosure.

Referring to FIG. 4, an imaging lens 2000 includes, in an order from an object side OBJ to an image plane IMG, a first lens 102 having a positive refractive power, a second lens 202 having a negative refractive power, a third lens 302 having a positive refractive power, a fourth lens 402 having a negative refractive power, and a fifth lens 502 having a positive refractive power. The first lens 102 includes an object side surface 1 and an image side surface 2, the second lens 202 includes an object side surface 3 and an image side surface 4, the third lens 302 includes an object side surface 5 and an image side surface 6, the fourth lens 402 includes an object side surface 7 and an image side surface 8, and the fifth lens 502 includes an object side surface 9 and an image side surface 10. A filter 600 includes an object side surface 11 and an image side 12.

Lens data of the second embodiment is described by way of example in the following Table 3 and Table 4.

Referring to Tables 3 and 4, the following variables are denoted by f=3.95 mm, FNO=1.99, and θ=40.87°. An "*" after a number of a surface indicates the surface is aspherical.

TABLE 3

| Surface | Curvature Radius | Thickness or Space | Refractive Index | Abbe Number |
|---|---|---|---|---|
| 1* | 2.174 | 0.741 | 1.618 | 63.44 |
| 2*(ST) | −28.125 | 0.04 | | |
| 3* | infinity | 0.28 | 1.643 | 22.4 |
| 4* | 4.529 | 0.248 | | |
| 5* | −37.189 | 0.611 | 1.544 | 56.09 |
| 6* | −5.274 | 0.531 | | |
| 7* | 3.047 | 0.407 | 1.643 | 22.4 |
| 8* | 1.929 | 0.299 | | |
| 9* | 1.68 | 0.752 | 1.544 | 56.09 |
| 10* | 1.46 | 0.577 | | |
| 11 | infinity | 0.11 | 1.517 | 64.2 |
| 12 | infinity | 0.3 | | |
| IMG | infinity | 0 | | |

TABLE 4

| Surface | 1 | 2 | 3 | 4 | 5 |
|---|---|---|---|---|---|
| K | −0.29099 | −1 | 99 | 22.31581 | 68.61718 |
| A | −2.01E−02 | −4.76E−02 | −2.62E−02 | −3.73E−02 | −9.77E−02 |
| B | 5.29E−03 | 1.29E−01 | 3.24E−01 | 1.96E−02 | 1.68E−01 |
| C | −1.95E−02 | −1.01E−01 | −8.31E−01 | 1.01E−01 | −1.05E+00 |
| D | 6.80E−04 | −2.75E−01 | 1.55E+00 | −6.61E−01 | 3.30E+00 |
| E | 7.59E−03 | 5.12E−01 | −2.31E+00 | 9.73E−01 | −5.78E+00 |
| F | −4.32E−03 | −2.46E−01 | 2.21E+00 | −4.39E−01 | 5.30E+00 |
| G | −4.04E−13 | −9.03E−10 | −8.93E−01 | 0.00E+00 | −1.86E+00 |
| H | 0.00E+00 | 0.00E+00 | 0.00E+00 | 0.00E+00 | 0.00E+00 |

| Surface | 6 | 7 | 8 | 9 | 10 |
|---|---|---|---|---|---|
| K | 20.90264 | −59.96443 | −34.53579 | −16.4826 | −8.19341 |
| A | −7.78E−02 | 1.27E−02 | −6.82E−02 | −2.43E−01 | −7.63E−02 |
| B | 1.72E−02 | −5.46E−02 | 1.26E−01 | 1.24E−01 | 1.51E−02 |
| C | 8.24E−02 | 4.60E−02 | −1.52E−01 | −6.13E−02 | −8.78E−04 |
| D | −3.17E−01 | −8.83E−02 | 9.08E−02 | 2.58E−02 | −1.16E−03 |
| E | 5.38E−01 | 7.35E−02 | −3.03E−02 | −6.36E−03 | 3.95E−04 |
| F | −4.20E−01 | −2.84E−02 | 5.37E−03 | 7.97E−04 | −5.38E−05 |
| G | 1.39E−01 | 3.60E−03 | −3.91E−04 | −3.96E−05 | 2.89E−06 |
| H | 0.00E+00 | 0.00E+00 | 0.00E+00 | 0.00E+00 | 0.00E+00 |

Figure 5A:
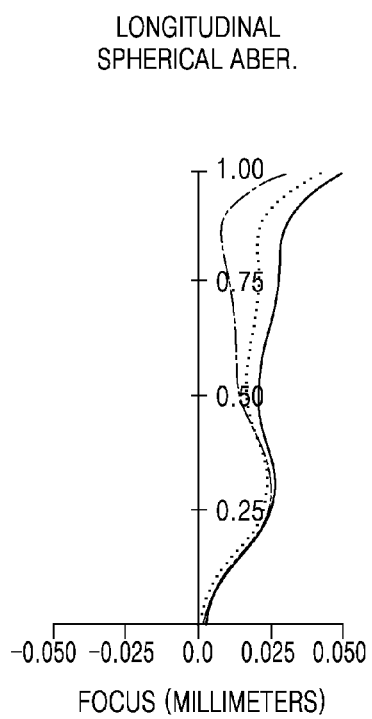
FIGS. 5A to 5C are aberration views illustrating a longitudinal spherical aberration, astigmatic field curves, and a distortion of an imaging lens of FIG. 4 according to an embodiment of the present disclosure.
Figure 5B:
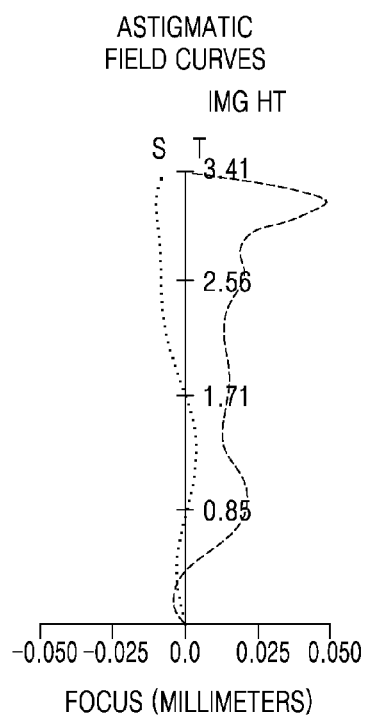
Figure 5C:
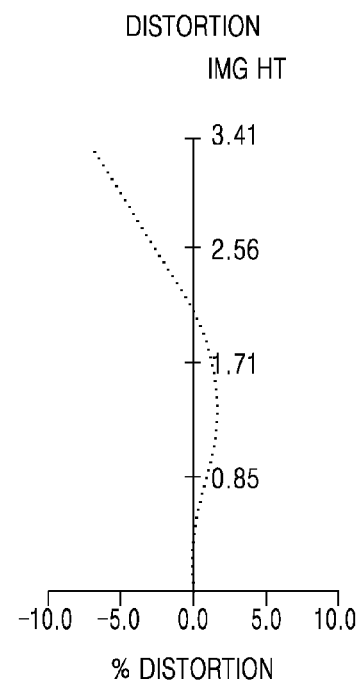

FIGS. 5A to 5C are aberration views illustrating a longitudinal spherical aberration, astigmatic field curves, and a distortion of an imaging lens system according to the second embodiment of the present disclosure.

Referring to FIG. 5A, longitudinal spherical aberrations are shown for lights having wavelengths of 656.27 nm, 587.56 nm, and 486.1300 nm.

Referring to FIG. 5B, astigmatic field curves are shown for light having a wavelength of 587.56 nm. In the graph of the astigmatic field curves, a sagittal field curvature and a tangential field curvature are respectively denoted by S and T.

Referring to FIG. 5C, distortion is shown for light having a wavelength of 587.56 nm.

Third Embodiment

Figure 6:
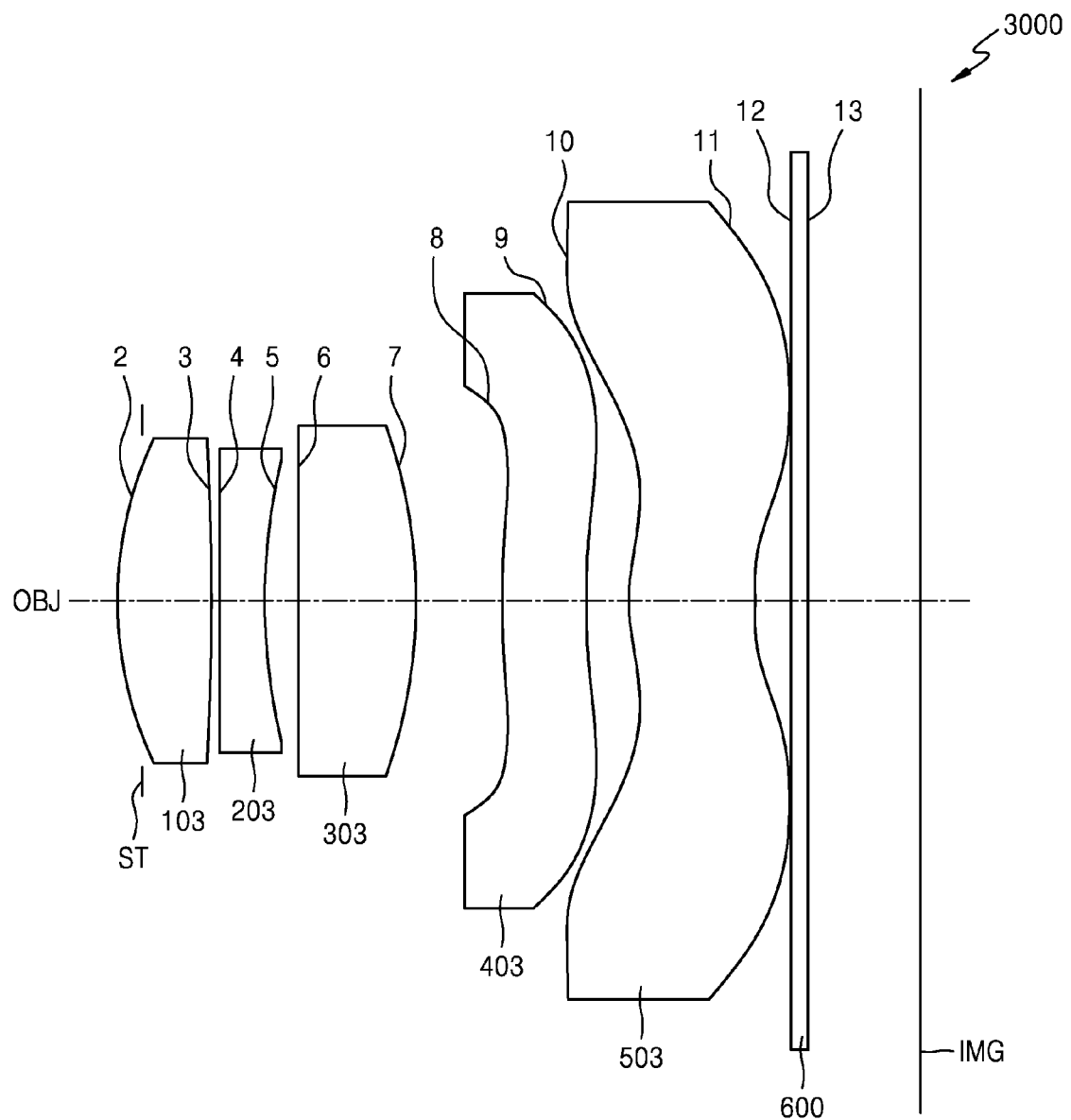
FIG. 6 illustrates an optical arrangement of an imaging lens according to an embodiment of the present disclosure.

FIG. 6 illustrates an optical arrangement of an imaging lens according to a third embodiment of the present disclosure.

Referring to FIG. 6, an imaging lens 3000 includes, in an order from an object side OBJ to an image plane IMG, a first lens 103 having a positive refractive power, a second lens 203 having a negative refractive power, a third lens 303 having a positive refractive power, a fourth lens 403 having a negative refractive power, and a fifth lens 503 having a negative refractive power. The first lens 103 includes an object side surface 2 and an image side surface 3, the second lens 203 includes an object side surface 4 and an image side surface 5, the third lens 303 includes an object side surface 6 and an image side surface 7, the fourth lens 403 includes an object side surface 8 and an image side surface 9, and the fifth lens 503 includes an object side surface 10 and an image side surface 11. A filter 600 includes an object side surface 12 and an image side 13.

Lens data of the third embodiment is described by way of example in the following Table 5 and Table 6.

Referring to Tables 5 and 6, the following variables are denoted by f=3.94 mm, FNO=1.99, and θ=40.93°. An "*" after a number of a surface indicates the surface is aspherical.

TABLE 5

| Surface | Curvature Radius | Thickness or Space | Refractive Index | Abbe Number |
|---|---|---|---|---|
| ST | infinity | −0.153 | | |
| 2* | 1.969 | 0.583 | 1.544 | 56.09 |
| 3* | infinity | 0.04 | | |
| 4* | infinity | 0.28 | 1.643 | 22.4 |
| 5* | 4.048 | 0.201 | | |
| 6* | 10.08 | 0.721 | 1.544 | 56.09 |
| 7* | −5.093 | 0.528 | | |
| 8* | 6.012 | 0.511 | 1.643 | 22.4 |
| 9* | 3.037 | 0.256 | | |
| 10* | 1.825 | 0.77 | 1.535 | 55.71 |
| 11* | 1.401 | 0.218 | | |
| 12 | infinity | 0.11 | 1.517 | 64.2 |

TABLE 5-continued

| Surface | Curvature Radius | Thickness or Space | Refractive Index | Abbe Number |
|---|---|---|---|---|
| 13 | infinity | 0.683 | | |
| IMG | infinity | 0 | | |

TABLE 6

| Surface | 2 | 3 | 4 | 5 | 6 |
|---|---|---|---|---|---|
| K | −0.34169 | 99 | 99 | 15.9477 | 97.52086 |
| A | −1.90E−02 | −7.00E−02 | −5.07E−02 | −6.63E−02 | −6.80E−02 |
| B | 9.36E−03 | 1.71E−01 | 2.03E−01 | 7.65E−02 | −5.68E−02 |
| C | −6.01E−02 | −3.02E−01 | −2.72E−01 | −2.03E−01 | 6.10E−02 |
| D | 5.94E−02 | 9.25E−02 | −6.83E−02 | 1.99E−01 | 1.19E−01 |
| E | −2.63E−02 | 3.09E−01 | 5.82E−01 | −1.66E−01 | −6.76E−01 |
| F | −1.85E−02 | −3.88E−01 | −5.72E−01 | 1.17E−01 | 9.27E−01 |
| G | 1.44E−02 | 1.49E−01 | 2.00E−01 | 0.00E+00 | −3.57E−01 |
| H | 0.00E+00 | 0.00E+00 | 0.00E+00 | 0.00E+00 | 0.00E+00 |

| Surface | 7 | 8 | 9 | 10 | 11 |
|---|---|---|---|---|---|
| K | 7.2246 | −92.90331 | −57.394 | −16.66242 | −4.56326 |
| A | −4.96E−02 | −1.77E−02 | −6.05E−02 | −1.93E−01 | −1.18E−01 |
| B | −4.54E−02 | −2.04E−02 | 7.63E−02 | −1.08E−02 | 4.93E−02 |
| C | 1.40E−01 | 3.49E−02 | −7.64E−02 | 9.77E−02 | −1.43E−02 |
| D | −3.36E−01 | −1.74E−01 | 3.82E−02 | −7.52E−02 | 1.98E−03 |
| E | 4.64E−01 | 2.65E−01 | −1.11E−02 | 3.08E−02 | 3.36E−05 |
| F | −3.29E−01 | −2.10E−01 | 1.87E−03 | −7.13E−03 | −5.08E−05 |
| G | 9.89E−02 | 8.55E−02 | −1.55E−04 | 8.73E−04 | 6.23E−06 |
| H | 0.00E+00 | −1.45E−02 | 3.87E−06 | −4.41E−05 | −2.37E−07 |

Figure 7A:
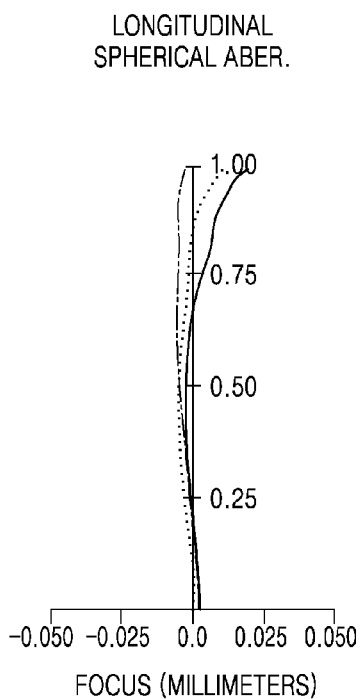
FIGS. 7A to 7C are aberration views illustrating a longitudinal spherical aberration, astigmatic field curves, and a distortion of an imaging lens of FIG. 6 according to an embodiment of the present disclosure.
Figure 7B:
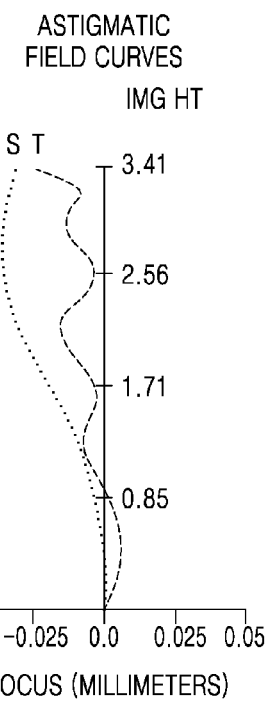
Figure 7C:
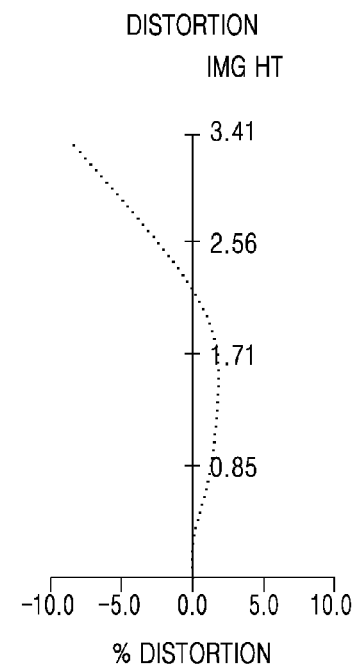

FIGS. 7A to 7C are aberration views illustrating a longitudinal spherical aberration, astigmatic field curves, and a distortion of an imaging lens system according to the third embodiment of the present disclosure.

Referring to FIG. 7A, longitudinal spherical aberrations are shown for lights having wavelengths of 656.27 nm, 587.56 nm, and 486.1300 nm.

Referring to FIG. 7B, astigmatic field curves are shown for light having a wavelength of 587.56 nm. In the graph of the astigmatic field curves, a sagittal field curvature and a tangential field curvature are respectively denoted by S and T.

Referring to FIG. 7C, distortion is shown for light having a wavelength of 587.56 nm.

Fourth Embodiment

Figure 8:
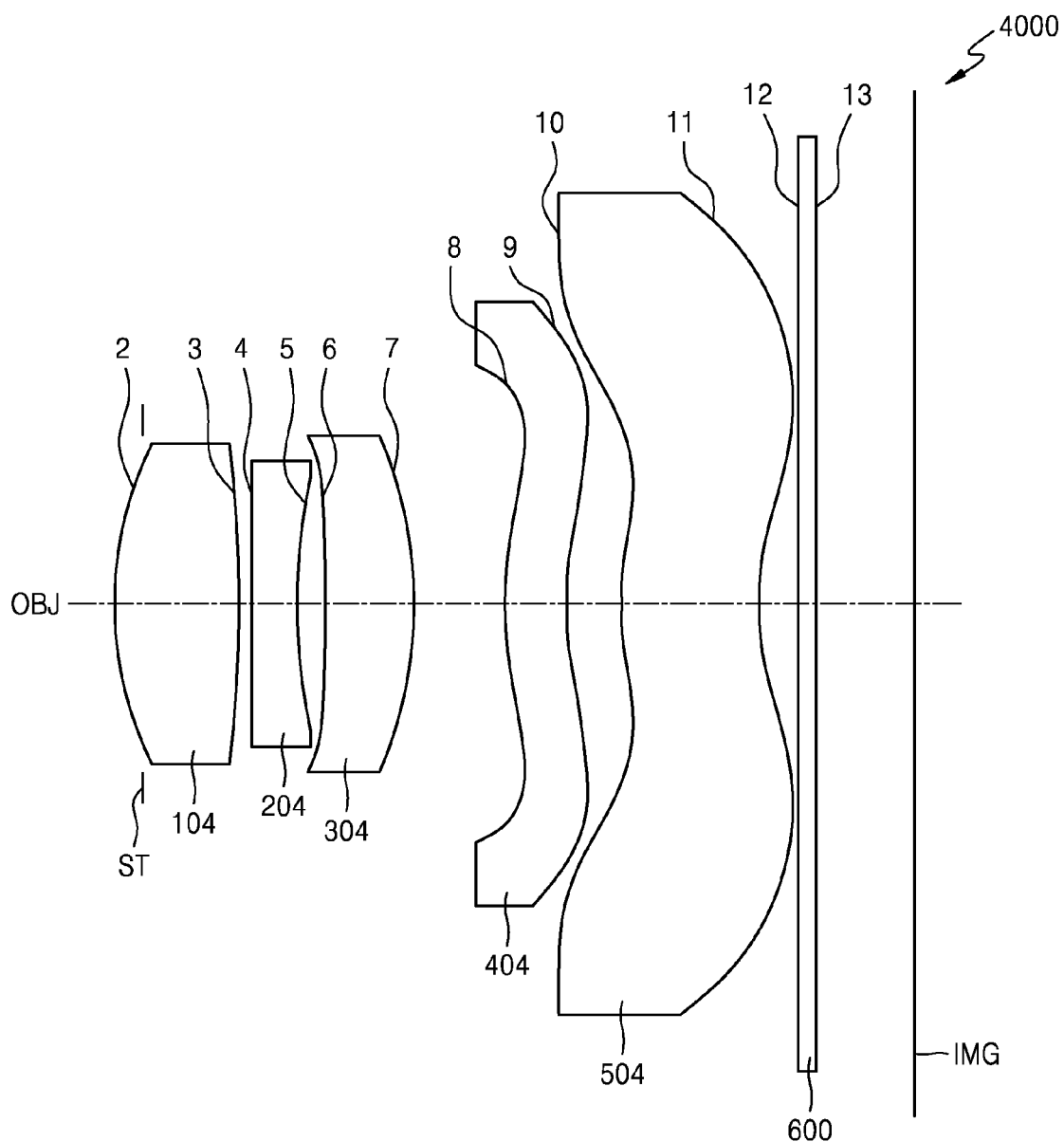
FIG. 8 illustrates an optical arrangement of an imaging lens according to an embodiment of the present disclosure.

FIG. 8 illustrates an optical arrangement of an imaging lens according to a fourth embodiment of the present disclosure.

Referring to FIG. 8, an imaging lens 4000 includes, in an order from an object side OBJ to an image plane IMG, a first lens 104 having a positive refractive power, a second lens 204 having a negative refractive power, a third lens 304 having a positive refractive power, a fourth lens 404 having a negative refractive power, and a fifth lens 504 having a positive refractive power. The first lens 104 includes an object side surface 2 and an image side surface 3, the second lens 204 includes an object side surface 4 and an image side surface 5, the third lens 304 includes an object side surface 6 and an image side surface 7, the fourth lens 404 includes an object side surface 8 and an image side surface 9, and the fifth lens 504 includes an object side surface 10 and an image side surface 11. A filter 600 includes an object side surface 12 and an image side 13. Lens data of the fourth embodiment is described by way of example in the following Table 7 and Table 8.

Referring to Tables 7 and 8, the following variables are denoted by f=3.895 mm, FNO=1.99, and θ=41.41°. An "*" after a number of a surface indicates the surface is aspherical.

TABLE 7

| Surface | Curvature Radius | Thickness or Space | Refractive Index | Abbe Number |
|---|---|---|---|---|
| ST | infinity | −0.151 | | |
| 2* | 2.01 | 0.757 | 1.5441 | 56.09 |
| 3* | −2000 | 0.083 | | |
| 4* | infinity | 0.28 | 1.6428 | 22.4 |
| 5* | 4.22 | 0.169 | | |
| 6* | 44.702 | 0.543 | 1.5441 | 56.09 |
| 7* | −5.427 | 0.551 | | |
| 8* | 2.216 | 0.38 | 1.6428 | 22.4 |
| 9* | 1.673 | 0.338 | | |
| 10* | 1.674 | 0.838 | 1.5348 | 55.71 |
| 11* | 1.41 | 0.248 | | |
| 12 | infinity | 0.11 | 1.5168 | 64.2 |
| 13 | infinity | 0.604 | | |
| IMG | infinity | 0 | | |

TABLE 8

| Surface | 2 | 3 | 4 | 5 | 6 |
|---|---|---|---|---|---|
| K | −0.18951 | −99 | 99 | 18.24157 | −99 |
| A | −1.50E−02 | −8.22E−02 | −7.28E−02 | −6.53E−02 | −1.29E−01 |
| B | −1.41E−03 | 1.58E−01 | 3.95E−01 | 1.10E−01 | 2.18E−01 |
| C | −1.69E−02 | −1.15E−01 | −9.80E−01 | 1.09E−01 | −1.13E+00 |
| D | 5.41E−03 | −3.62E−01 | 1.83E+00 | −8.96E−01 | 3.80E+00 |

TABLE 8-continued

| | | | | | |
|---|---|---|---|---|---|
| E | 4.44E−03 | 6.57E−01 | −2.89E+00 | 1.22E+00 | −7.24E+00 |
| F | −5.63E−03 | −3.21E−01 | 2.88E+00 | −5.72E−01 | 6.92E+00 |
| G | −1.40E−12 | −1.23E−09 | −1.21E+00 | 0.00E+00 | −2.52E+00 |
| H | 0.00E+00 | 0.00E+00 | 0.00E+00 | 0.00E+00 | 0.00E+00 |

| Surface | 7 | 8 | 9 | 10 | 11 |
|---|---|---|---|---|---|
| K | 23.41039 | −25.14383 | −18.08554 | −9.78716 | −6.1312 |
| A | −1.05E−01 | 1.95E−02 | −8.52E−02 | −2.60E−01 | −8.11E−02 |
| B | 2.77E−02 | −4.60E−02 | 1.53E−01 | 1.36E−01 | 1.88E−02 |
| C | 9.89E−02 | 4.70E−02 | −1.80E−01 | −7.07E−02 | −9.45E−04 |
| D | −3.98E−01 | −9.09E−02 | 1.09E−01 | 3.10E−02 | −1.43E−03 |
| E | 6.72E−01 | 7.76E−02 | −3.78E−02 | −7.95E−03 | 5.02E−04 |
| F | −5.48E−01 | −3.15E−02 | 6.99E−03 | 1.04E−03 | −6.89E−05 |
| G | 1.89E−01 | 4.77E−03 | −5.28E−04 | −5.43E−05 | 3.47E−06 |
| H | 0.00E+00 | 0.00E+00 | 0.00E+00 | 0.00E+00 | 0.00E+00 |

Figure 9A:
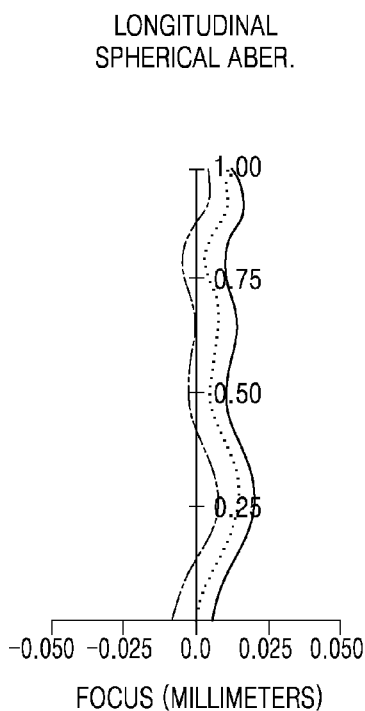
FIGS. 9A to 9C are aberration views illustrating a longitudinal spherical aberration, astigmatic field curves, and a distortion of an imaging lens of FIG. 8 according to an embodiment of the present disclosure.
Figure 9B:
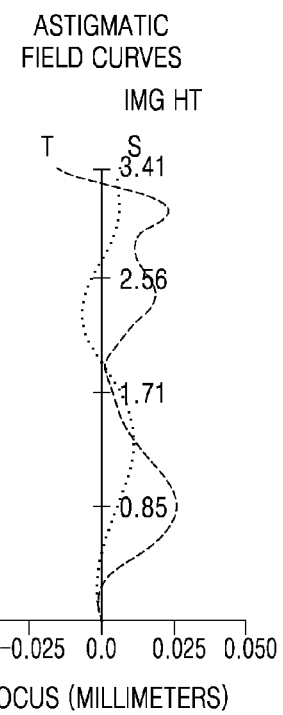
Figure 9C:
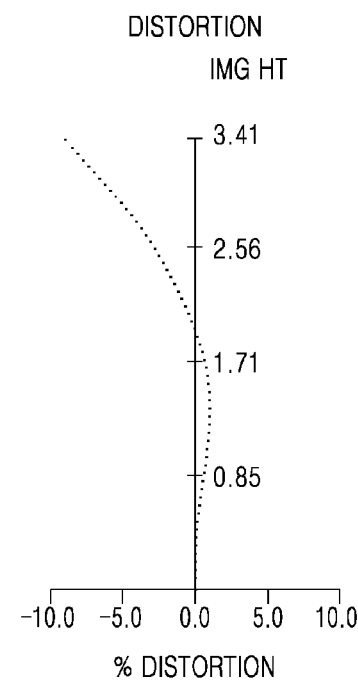

FIGS. 9A to 9C are aberration views illustrating a longitudinal spherical aberration, astigmatic field curves, and a distortion of an imaging lens system according to the fourth embodiment of the present disclosure.

Referring to FIG. 9A, longitudinal spherical aberrations are shown for lights having wavelengths of 656.27 nm, 587.56 nm, and 486.1300 nm.

Referring to FIG. 9B, astigmatic field curves are shown for light having a wavelength of 587.56 nm. In the graph of the astigmatic field curves, a sagittal field curvature and a tangential field curvature are respectively denoted by S and T.

Referring to FIG. 9C, distortion is shown for light having a wavelength of 587.56 nm.

Fifth Embodiment

Figure 10:
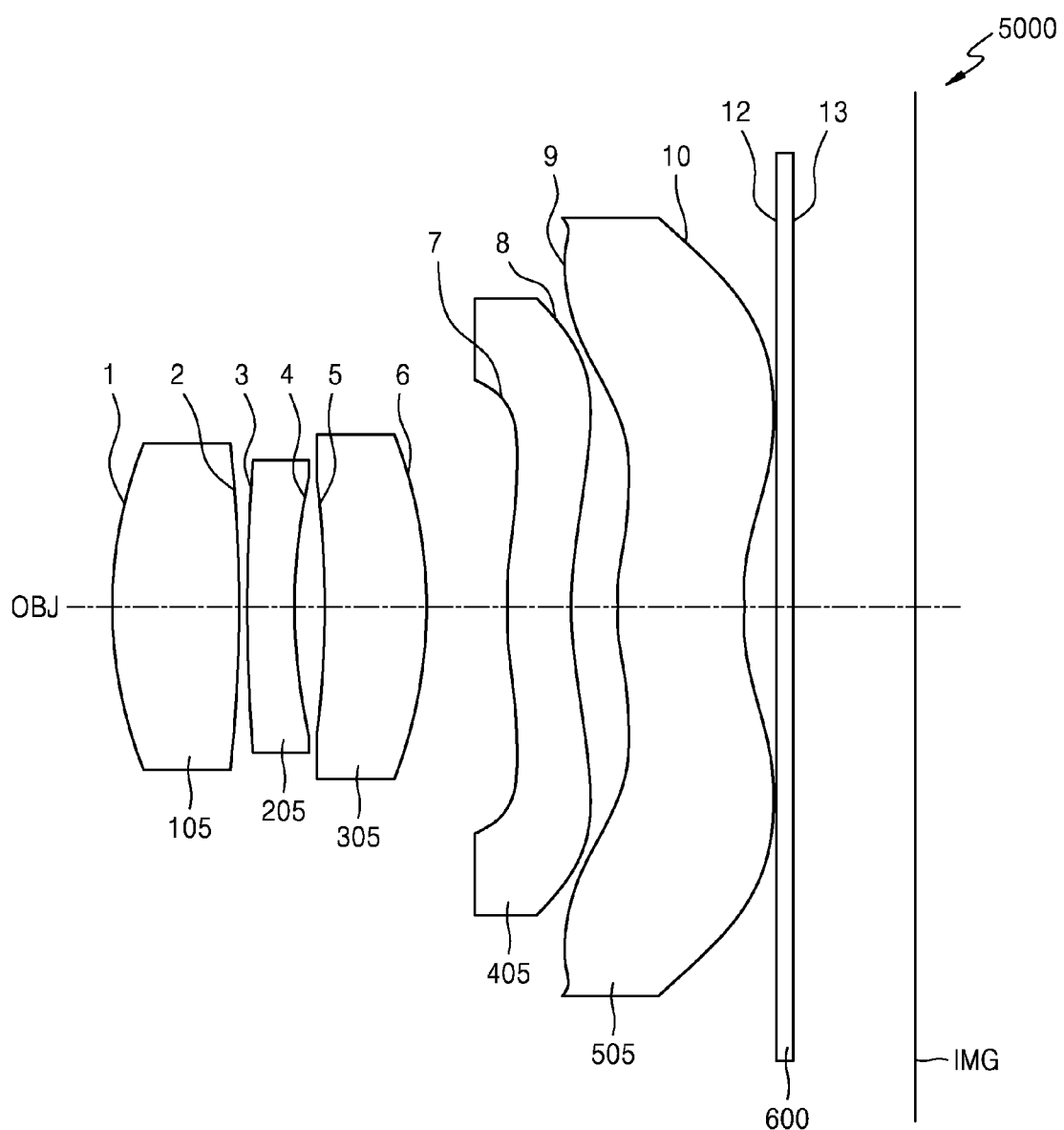
FIG. 10 illustrates an optical arrangement of an imaging lens according to an embodiment of the present disclosure.

FIG. 10 illustrates an optical arrangement of an imaging lens according to a fifth embodiment of the present disclosure.

Referring to FIG. 10, an imaging lens 5000 includes, in an order from an object side OBJ to an image plane IMG, a first lens 105 having a positive refractive power, a second lens 205 having a negative refractive power, a third lens 305 having a positive refractive power, a fourth lens 405 having a negative refractive power, and a fifth lens 505 having a positive refractive power. The first lens 105 includes an object side surface 1 and an image side surface 2, the second lens 205 includes an object side surface 3 and an image side surface 4, the third lens 305 includes an object side surface 5 and an image side surface 6, the fourth lens 405 includes an object side surface 7 and an image side surface 8, and the fifth lens 505 includes an object side surface 9 and an image side surface 10. A filter 600 includes an object side surface 12 and an image side 13.

Lens data of the fifth embodiment is described by way of example in the following Table 9 and Table 10.

Referring to Tables 9 and 10, the following variables are denoted by f=3.88 mm, FNO=1.99, and θ=41.49°. An "*" after a number of a surface indicates the surface is aspherical.

TABLE 9

| Surface | Curvature Radius | Thickness or Space | Refractive Index | Abbe Number |
|---|---|---|---|---|
| 1* | 2.11 | 0.77 | 1.61788 | 63.44 |
| 2*(ST) | −2000 | 0.05 | | |
| 3* | infinity | 0.28 | 1.6428 | 22.4 |
| 4* | 4.607 | 0.182 | | |
| 5* | −65.206 | 0.609 | 1.5441 | 56.09 |
| 6* | −5.508 | 0.487 | | |
| 7* | 3.017 | 0.392 | 1.6428 | 22.4 |
| 8* | 1.955 | 0.281 | | |
| 9* | 1.558 | 0.753 | 1.5441 | 56.09 |
| 10* | 1.412 | 0.192 | | |
| 11 | infinity | 0.11 | 1.5168 | 64.2 |
| 12 | infinity | 0.725 | | |
| IMG | infinity | 0 | | |

TABLE 10

| Surface | 1 | 2 | 3 | 4 | 5 |
|---|---|---|---|---|---|
| K | −0.30709 | −1 | 99 | 23.57458 | 79.34745 |
| A | −2.14E−02 | −7.27E−02 | −1.86E−02 | −4.02E−03 | −1.04E−01 |
| B | 5.25E−03 | 1.31E−01 | 3.52E−01 | 1.61E−02 | 1.58E−01 |
| C | −3.13E−02 | −9.62E−02 | −9.58E−01 | 1.87E−01 | −1.10E+00 |
| D | 1.53E−02 | −3.59E−01 | 1.83E+00 | −9.38E−01 | 3.74E+00 |
| E | 1.19E−03 | 6.48E−01 | −2.85E+00 | 1.20E+00 | −7.14E+00 |
| F | −5.54E−03 | −3.15E−01 | 2.83E+00 | −5.63E−01 | 6.80E+00 |
| G | −2.67E−13 | −1.20E−09 | −1.19E+00 | 0.00E+00 | −2.48E+00 |
| H | 0.00E+00 | 0.00E+00 | 0.00E+00 | 0.00E+00 | 0.00E+00 |

| Surface | 6 | 7 | 8 | 9 | 10 |
|---|---|---|---|---|---|
| K | 23.76189 | −53.9959 | −33.92257 | −12.34681 | −6.97022 |
| A | −8.28E−02 | 3.76E−02 | −5.68E−02 | −2.46E−01 | −8.29E−02 |
| B | −9.30E−03 | −7.54E−02 | 1.34E−01 | 1.34E−01 | 1.79E−02 |

TABLE 10-continued

| | | | | | |
|---|---|---|---|---|---|
| C | 1.30E−01 | 5.80E−02 | −1.74E−01 | −7.03E−02 | −1.23E−03 |
| D | −4.05E−01 | −9.86E−02 | 1.08E−01 | 3.07E−02 | −1.43E−03 |
| E | 6.62E−01 | 8.39E−02 | −3.75E−02 | −7.83E−03 | 4.99E−04 |
| F | −5.39E−01 | −3.43E−02 | 6.87E−03 | 1.02E−03 | −6.76E−05 |
| G | 1.85E−01 | 4.80E−03 | −5.18E−04 | −5.31E−05 | 3.62E−06 |
| H | 0.00E+00 | 0.00E+00 | 0.00E+00 | 0.00E+00 | 0.00E+00 |

Figure 11A:
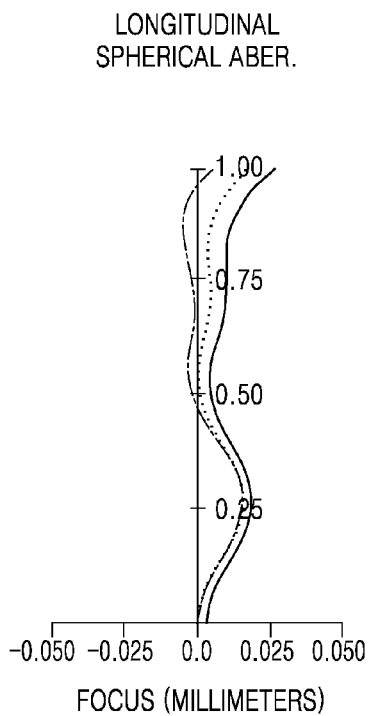
FIGS. 11A to 11C are aberration views illustrating a longitudinal spherical aberration, astigmatic field curves, and a distortion of an imaging lens according to an embodiment of the present disclosure.
Figure 11B:
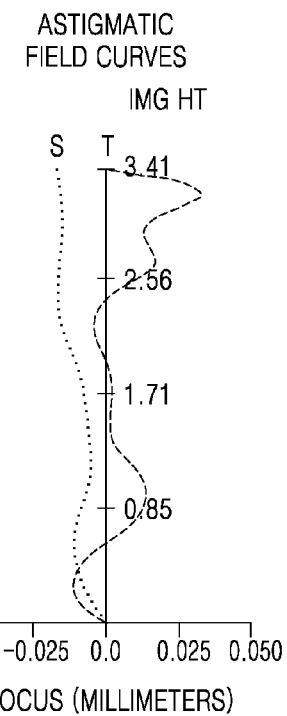
Figure 11C:
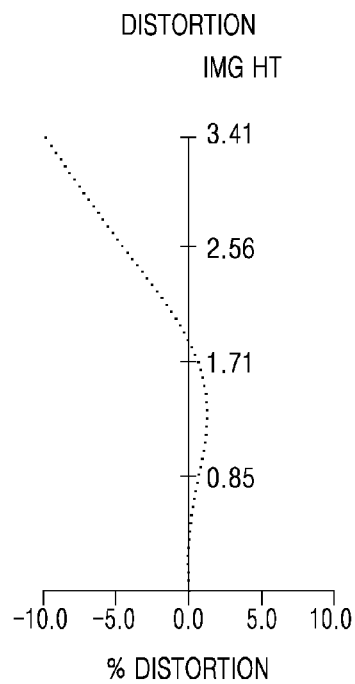

FIGS. 11A to 11C are aberration views illustrating a longitudinal spherical aberration, astigmatic field curves, and a distortion of an imaging lens system according to the fifth embodiment of the present disclosure.

Referring to FIG. 11A, longitudinal spherical aberrations are shown for lights having wavelengths of 656.27 nm, 587.56 nm, and 486.1300 nm.

Referring to FIG. 11B, astigmatic field curves are shown for light having a wavelength of 587.56 nm. In the graph of the astigmatic field curves, a sagittal field curvature and a tangential field curvature are respectively denoted by S and T.

Referring to FIG. 11C, distortion is shown for light having a wavelength of 587.56 nm.

Sixth Embodiment

Figure 12:
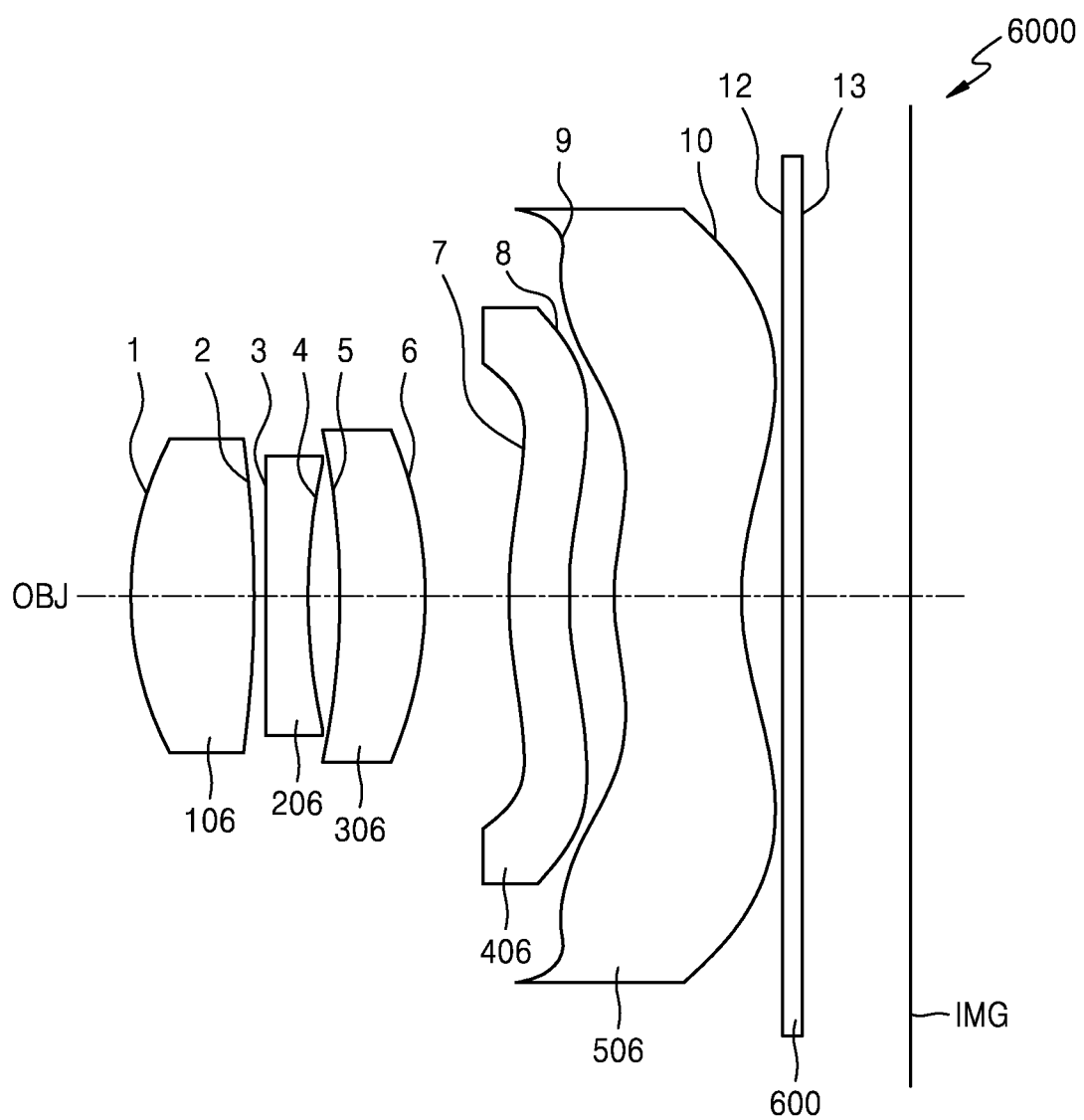
FIG. 12 illustrates an optical arrangement of an imaging lens according to an embodiment of the present disclosure.

FIG. 12 illustrates an optical arrangement of an imaging lens according to a sixth embodiment of the present disclosure.

Referring to FIG. 12, an imaging lens 6000 includes, in an order from an object side OBJ to an image plane IMG, a first lens 106 having a positive refractive power, a second lens 206 having a negative refractive power, a third lens 306 having a positive refractive power, a fourth lens 406 having a negative refractive power, and a fifth lens 506 having a positive refractive power. The first lens 106 includes an object side surface 1 and an image side surface 2, the second lens 206 includes an object side surface 3 and an image side surface 4, the third lens 306 includes an object side surface 5 and an image side surface 6, the fourth lens 406 includes an object side surface 7 and an image side surface 8, and the fifth lens 506 includes an object side surface 9 and an image side surface 10. A filter 600 includes an object side surface 12 and an image side 13.

Lens data of the sixth embodiment is described by way of example in the following Table 11 and Table 12.

Referring to Tables 11 and 12, the following variables are denoted by f=3.47 mm, FNO=1.98, and θ=40.22°. An "*" after a number of a surface indicates the surface is aspherical.

TABLE 11

| Surface | Curvature Radius | Thickness or Space | Refractive Index | Abbe Number |
|---|---|---|---|---|
| 1* | 1.762 | 0.681 | 1.5441 | 56.09 |
| 2*(ST) | −2000 | 0.076 | | |
| 3* | infinity | 0.234 | 1.6428 | 22.4 |
| 4* | 3.697 | 0.173 | | |
| 5* | 44.645 | 0.477 | 1.5441 | 56.09 |
| 6* | −4.87 | 0.474 | | |
| 7* | 2.393 | 0.329 | 1.6428 | 22.4 |
| 8* | 1.831 | 0.258 | | |
| 9* | 1.509 | 0.71 | 1.5348 | 56 |
| 10* | 1.266 | 0.224 | | |
| 11 | infinity | 0.11 | 1.5168 | 64.2 |
| 12 | infinity | 0.604 | | |
| IMG | infinity | 0 | | |

TABLE 12

| Surface | 1 | 2 | 3 | 4 | 5 |
|---|---|---|---|---|---|
| K | −0.16413 | −99 | 99 | 18.22702 | −99 |
| A | −2.12E−02 | −1.10E−01 | −1.10E−01 | −1.10E−01 | −1.95E−01 |
| B | 6.78E−03 | 2.70E−01 | 6.80E−01 | 1.96E−01 | 3.64E−01 |
| C | −4.49E−02 | −2.52E−01 | −2.11E+00 | 2.23E−01 | −2.44E+00 |
| D | 1.31E−02 | −9.73E−01 | 4.91E+00 | −2.44E+00 | 1.03E+01 |
| E | 1.74E−02 | 2.20E+00 | −9.68E+00 | 4.08E+00 | −2.42E+01 |
| F | −2.35E−02 | −1.34E+00 | 1.20E+01 | −2.39E+00 | 2.88E+01 |
| G | 2.36E−10 | −6.39E−09 | −6.31E+00 | 0.00E+00 | −1.31E+01 |
| H | 0.00E+00 | 0.00E+00 | 0.00E+00 | 0.00E+00 | 0.00E+00 |

| Surface | 6 | 7 | 8 | 9 | 10 |
|---|---|---|---|---|---|
| K | 22.99653 | −27.46389 | −22.37128 | −9.83156 | −6.04799 |
| A | −1.55E−01 | 2.39E−02 | −1.15E−01 | −3.59E−01 | −1.15E−01 |
| B | 3.14E−02 | −8.83E−02 | 2.59E−01 | 2.36E−01 | 3.27E−02 |
| C | 2.19E−01 | 1.04E−01 | −3.89E−01 | −1.53E−01 | −2.12E−03 |
| D | −1.05E+00 | −2.43E−01 | 2.94E−01 | 8.34E−02 | −3.86E−03 |
| E | 2.25E+00 | 2.58E−01 | −1.27E−01 | −2.66E−02 | 1.68E−03 |
| F | −2.28E+00 | −1.32E−01 | 2.92E−02 | 4.34E−03 | −2.87E−04 |
| G | 9.79E−01 | 2.58E−02 | −2.75E−03 | −2.82E−04 | 1.82E−05 |
| H | 0.00E+00 | 0.00E+00 | 0.00E+00 | 0.00E+00 | 0.00E+00 |

Figure 13A:
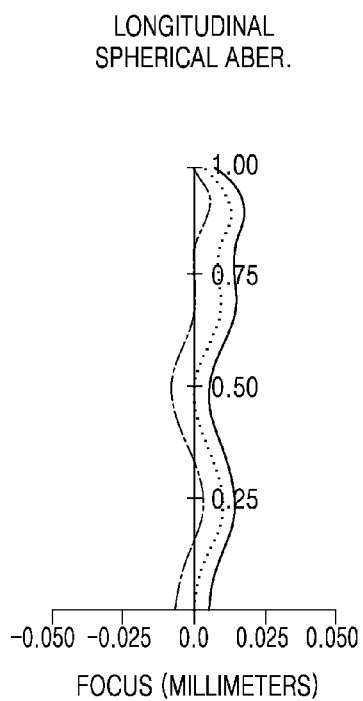
FIGS. 13A to 13C are aberration views illustrating a longitudinal spherical aberration, astigmatic field curves, and a distortion of an imaging lens of FIG. 12 according to an embodiment of the present disclosure.
Figure 13B:
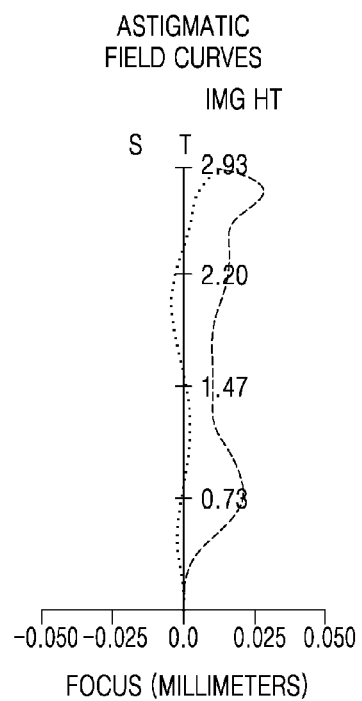
Figure 13C:
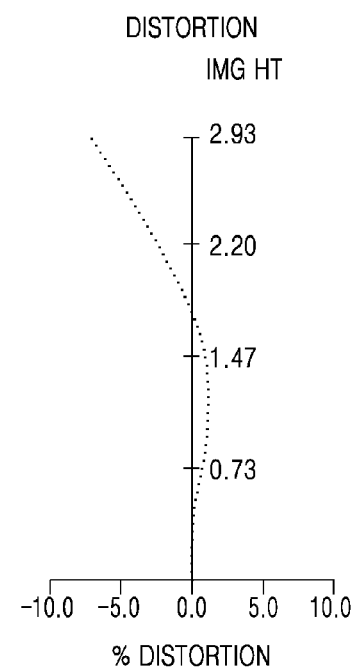

FIGS. 13A to 13C are aberration views illustrating a longitudinal spherical aberration, astigmatic field curves, and a distortion of an imaging lens system according to the sixth embodiment of the present disclosure.

Referring to FIG. 13A, longitudinal spherical aberrations are shown for lights having wavelengths of 656.27 nm, 587.56 nm, and 486.1300 nm.

Referring to FIG. 13B, astigmatic field curves are shown for light having a wavelength of 587.56 nm. In the graph of the astigmatic field curves, a sagittal field curvature and a tangential field curvature are respectively denoted by S and T.

Referring to FIG. 13C, distortion is shown for light having a wavelength of 587.56 nm.

Table 13 below shows various optical specifications related to the above conditions such as an optical total length TL, a focal length f, a half view angle θ, and focal lengths f1, f2, f3, f4, and f5 of the respective lenses of the imaging lenses 1000 through 6000 according to the embodiments.

An imaging lens according to the above-described embodiments may include up to five lenses a filter and yet maintain an appropriate total length to be mounted in ultra-thin electronic devices.

In addition, as an appropriate number of aspherical surfaces are included among the lenses included in the imaging lenses, a total length may be minimized and aberration may be corrected at the same time. Accordingly, high image quality may be provided.

It should be understood that embodiments described herein should be considered in a descriptive sense only and not for purposes of limitation. Descriptions of features or aspects within each embodiment should typically be considered as available for other similar features or aspects in other embodiments.

TABLE 13

|  | Embodiment | | | | | |
|---|---|---|---|---|---|---|
|  | First embodiment | Second embodiment | Third embodiment | Fourth embodiment | Fifth embodiment | Sixth embodiment |
| Total length (TL') | 4.90 mm | 4.90 mm | 4.90 mm | 4.90 mm | 4.83 mm | 4.35 mm |
| Total length (TL, in air) | 4.86 mm | 4.86 mm | 4.86 mm | 4.86 mm | 4.79 mm | 4.31 mm |
| $y_p$ | 3.415 mm | 3.415 mm | 3.415 mm | 3.415 mm | 3.415 mm | 2.934 mm |
| Y | 3.17 mm | 3.17 mm | 3.12 mm | 3.11 mm | 3.08 mm | 2.73 |
| f | 3.94 mm | 3.95 mm | 3.94 mm | 3.89 mm | 3.88 mm | 3.47 mm |
| θ | 40.95 deg | 40.86 deg | 40.92 deg | 41.26 deg | 41.38 deg | 40.18 deg |
| f1 | 3.51 mm | 3.30 mm | 3.62 mm | 3.69 mm | 3.41 mm | 3.24 mm |
| f2 | −6.12 mm | −7.05 mm | −6.30 mm | −6.57 mm | −7.17 mm | −5.75 mm |
| f3 | 6.72 mm | 11.22 mm | 6.32 mm | 8.93 mm | 11.02 mm | 8.10 mm |
| f4 | −11.52 mm | −9.53 mm | −10.24 mm | −14.60 mm | −10.09 mm | −15.72 mm |
| f5 | −26.07 mm | 98.91 mm | −30.79 mm | 161.69 mm | 33.74 mm | 795.42 mm |
| R1 | 1.91 mm | 2.17 mm | 1.97 mm | 2.01 mm | 2.11 mm | 1.76 mm |
| R2 | −2000.00 mm | −28.12 mm | Infinity | −2000.00 mm | −2000.00 mm | −2000.00 mm |
| R3 | Infinity | Infinity | Infinity | Infinity | Infinity | Infinity |
| R4 | 3.93 mm | 4.53 mm | 4.05 mm | 4.22 mm | 4.61 mm | 3.70 mm |
| FNO | 1.99 | 1.99 | 1.99 | 1.99 | 1.99 | 1.98 |
| V2 | 22.4 | 22.4 | 22.4 | 22.4 | 22.4 | 22.4 |
| V3 | 56.1 | 56.1 | 56.1 | 56.1 | 56.1 | 56.1 |

Table 14 below shows that the embodiments satisfy Equations 1 through 8 described above.

TABLE 14

| Equation | First embodiment | Second embodiment | Third embodiment | Fourth embodiment | Fifth embodiment | Sixth embodiment |
|---|---|---|---|---|---|---|
| (1) (Y − yp)/yp | −0.073 | −0.070 | −0.086 | −0.088 | −0.098 | −0.068 |
| (2) (((1/f) * (Y/tanθ) − 1)) * 100 | −7.29 | −7.06 | −8.68 | −8.81 | −9.81 | −6.80 |
| (3) TL/(2* yp) | 0.71 | 0.71 | 0.71 | 0.71 | 0.70 | 0.73 |
| (4) |(R3 + R4)/(R3 − R4)| | 1.00 | 1.00 | 1.00 | 1.00 | 1.00 | 1.00 |
| (5) f/f3 | 0.586 | 0.352 | 0.623 | 0.436 | 0.352 | 0.429 |
| (6) |V2 − V3| | 33.69 | 33.69 | 33.69 | 33.69 | 33.69 | 33.69 |
| (7) f/f4 | −0.342 | −0.414 | −0.385 | −0.267 | −0.384 | −0.221 |
| (8) |f/f5| | 0.15 | 0.04 | 0.13 | 0.02 | 0.11 | 0.00 |

The above-described embodiments have a short total length and excellent optical performance at the same time.

The above-described embodiments may be applied to an image sensor that converts an optical image formed through the imaging lenses described above into an electrical signal, and to various types of such imaging apparatuses. The imaging apparatus may be installed in electronic devices having small profiles, such as a slim smartphone having a small thickness.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An imaging lens comprising, in an order from an object side to an image plane side:
   a first lens having an object side surface that is convex and having a positive refractive power;

a second lens having a positive or negative refractive power;
a third lens having a positive or negative refractive power;
a fourth lens having a negative refractive power; and
a fifth lens having a positive or negative refractive power,
wherein an image side surface of the fifth lens has a concave center portion and has at least one inflection point,
wherein the imaging lens has negative optical distortion,
wherein the imaging lens satisfies conditions:

$-0.25 \leq (Y-y_p)/y_p \leq -0.05$, and $0.5 < TL/(2*yp) < 0.75$, and wherein Y denotes an image height of a real chief ray, $y_p$ denotes an image height of a paraxial chief ray, and TL denotes a distance from a vertex of the object side surface of the first lens to an image plane along an optical axis.

2. The imaging lens of claim 1,
wherein the imaging lens satisfies a condition:

$|(R3+R4)/(R3-R4)|=1$, and wherein R3 and R4 respectively denote a radius of curvature of a vertex of an object side surface of the second lens and a radius of curvature of a vertex of an image side surface of the second lens.

3. The imaging lens of claim 1,
wherein the imaging lens satisfies a condition:

$0.1 < f/f3 < 0.8$, and wherein f denotes a focal length of the imaging lens, and f3 denotes a focal length of the third lens.

4. The imaging lens of claim 1,
wherein the imaging lens satisfies a condition:

$|V2-V3|>30$, and wherein V2 and V3 are respectively Abbe numbers of the second lens and the third lens.

5. The imaging lens of claim 1,
wherein the imaging lens satisfies a condition:

$-0.7 < f/f4 < -0.1$, and wherein f denotes a focal length of the imaging lens, and f4 denotes a focal length of the fourth lens.

6. The imaging lens of claim 1,
wherein the imaging lens satisfies a condition:

$|f/f5|<0.2$, and wherein f denotes a focal length of the imaging lens, and f5 denotes a focal length of the fifth lens.

7. An imaging lens comprising, in an order from an object side to an image plane side:
a first lens having an object side surface having an aspherical shape that is convex in a center portion and an image side surface having a planar or convex aspherical shape, the first lens having a positive refractive power;
a second lens having at least one surface that has an aspherical shape that is planar in a center portion;
a third lens having a convex image side surface and a positive refractive power;
a fourth lens having a negative refractive power; and
a fifth lens having a positive or negative refractive power,
wherein the imaging lens has negative optical distortion,
wherein the imaging lens satisfies conditions:

$-0.25 \leq (Y-y_p)/y_p \leq -0.05$, and $0.5 < TL/(2*yp) < 0.75$, and wherein Y denotes an image height of a real chief ray, $y_p$ denotes an image height of a paraxial chief ray, and TL denotes a distance from a vertex of the object side surface of the first lens to an image plane along an optical axis.

8. The imaging lens of claim 7,
wherein the imaging lens satisfies a condition:

$0.1 < f/f3 < 0.8$, and wherein f denotes a focal length of the imaging lens, and f3 denotes a focal length of the third lens.

9. The imaging lens of claim 7,
wherein the imaging lens satisfies a condition:

$|V2-V3|>30$, and wherein V2 and V3 are respectively Abbe numbers of the second lens and the third lens.

10. The imaging lens of claim 7,
wherein the imaging lens satisfies a condition:

$-0.7 < f/f4 < -0.1$, and wherein f denotes a focal length of the imaging lens, and f4 denotes a focal length of the fourth lens.

11. The imaging lens of claim 7,
wherein the imaging lens satisfies a condition:

$|f/f5|<0.2$, and wherein f denotes a focal length of the imaging lens, and f5 denotes a focal length of the fifth lens.

12. The imaging lens of claim 7,
wherein an object side surface of the fifth lens has an aspherical shape having a convex center portion, and
wherein an image side surface of the fifth lens has an aspherical shape having a concave center portion and at least one inflection point.

13. An imaging apparatus comprising:
an imaging lens comprising:
a first lens having an object side surface that is convex and having a positive refractive power;
a second lens having a positive or negative refractive power;
a third lens having a positive or negative refractive power;
a fourth lens having a negative refractive power;
a fifth lens having a positive or negative refractive power, an image side surface of the fifth lens having a concave center portion and has at least one inflection point; and
an image sensor configured to convert an optical image formed using the imaging lens into an electrical signal,
wherein the imaging lens has negative optical distortion,
wherein the imaging lens satisfies conditions:

$-0.25 \leq (Y-y_p)/y_p \leq -0.05$, and $0.5 < TL/(2*y_p) < 0.75$, and wherein Y denotes an image height of a real chief ray, $y_p$ denotes an image height of a paraxial chief ray, and TL denotes a distance from a vertex of the object side surface of the first lens to an image plane along an optical axis.

* * * * *